United States Patent [19]

Sfarti

[11] Patent Number: 4,941,111

[45] Date of Patent: Jul. 10, 1990

[54] VIDEO PICKING AND CLIPPING METHOD AND APPARATUS

[75] Inventor: Adrian Sfarti, Sunnyvale, Calif.

[73] Assignee: Advanced Micro Devices, Inc., Sunnyvale, Calif.

[21] Appl. No.: 853,492

[22] Filed: Apr. 18, 1986

[51] Int. Cl.⁵ ............................................. G06F 15/72
[52] U.S. Cl. ..................................... 364/521; 340/724
[58] Field of Search ............... 340/724, 734, 801, 709, 340/725, 729; 364/521, 518

[56] References Cited

U.S. PATENT DOCUMENTS

| | | | |
|---|---|---|---|
| 4,243,984 | 1/1981 | Ackley et al. | 340/725 X |
| 4,245,244 | 1/1981 | Lijewski et al. | 340/709 X |
| 4,412,296 | 10/1983 | Taylor | 364/522 X |
| 4,672,683 | 6/1987 | Matsueda | 340/734 X |
| 4,675,666 | 6/1987 | Peterson | 340/729 X |
| 4,686,522 | 8/1987 | Hernandez et al. | 340/709 |
| 4,689,616 | 8/1987 | Goude et al. | 340/724 X |
| 4,747,074 | 5/1988 | Yoshida | 364/521 X |

Primary Examiner—Gary V. Harkcom
Assistant Examiner—Mark K. Zimmerman
Attorney, Agent, or Firm—Fliesler, Dubb, Meyer & Lovejoy

[57] ABSTRACT

The picking method and apparatus comprise: A CPU and a direct memory access (DMA) circuit which is used with a graphics microprocessor (G$\mu$P) for virtually redrawing a display list from a system memory of objects in a bit map. A starting address and a number corresponding to the number of instructions in a segment comprising a plurality of display lists are sent to the DMA for this purpose. When the coordinates of a pointer match the coordinates of a selected data object, a pick interrupt signal and special pick instruction is sent to the CPU. The CPU then uses the starting address of the display list of a selected object from a table to generate a new display list to perform a pre-selected operation on the selected data object. The clipping method and apparatus comprise a plurality of data planes for storing data objects, a match plane for storing a clipping object and a one-bit register. In use, the pixels in the data and match planes are scanned. When a match occurs between a pixel in the match plane and the contents of the one-bit register, a match signal is generated. The match signal enables the data planes to re-store the corresponding pixels of the data objects in the match planes.

20 Claims, 4 Drawing Sheets

VIDEO PICKING AND CLIPPING METHOD AND APPARATUS

BACKGROUND OF THE INVENTION

1. Field of the Invention

The present invention relates to a method and an apparatus for picking and operating on a data object on a video display and for clipping unwanted portions from a data object displayed on a video display.

2. Description of Prior Art

Picking is a descriptive term used in general for describing methods and apparatus involving the selection of a data object from among a plurality of objects appearing on a video display. Once an object has been picked, it can be operated on in any one of a variety of fashions. For example, it could be moved, changed in size or color, removed from the display, etc.

One of the methods used to produce an object on a video display is to produce the object from pixels in a bit map. The objects are drawn in the bit map in response to the execution of a plurality of instructions. For example, to draw a line in a bit map, a graphics controller is typically provided with the X and Y coordinates of the end points of the line. Thereafter, a set of instructions, called a display list, calculates and stores the location of each of the intermediate pixels required to be displayed between the end points of the line in the bit map. For more complicated objects, more complex algorithms are used which generally require a proportionally larger number of instructions. After the objects are stored in the bit map, the bit map is scanned row by row to display the objects on the video display.

An advantage of using a bit map is that there is no need to re-execute the display list to reproduce the objects on the video display and, therefore, the CPU used to produce the bit map is thereafter free to perform other operations.

A disadvantage of the above-described method of producing objects on a display using a bit map is that once all of the objects are drawn in the bit map, the identity of the individual objects is lost. For example, if a circle and a triangle are drawn in the bit map, they simply appear as streams of pixels in the bit map. Therefore, when picking an object from a display using a pointer in a conventional apparatus which uses a bit map, there is no means provided for separately processing the objects in the bit map without re-executing the entire display list associated therewith. In the past, as will be further described below, this has required an undesirable amount of CPU time even in systems which employed a direct memory access (DMA) circuit for loading display lists in a graphics microprocessor.

Another method used for displaying objects in a display list on a video display, but which does not require the use of a bit map, is a method and apparatus which continually refreshes a video display by continually re-executing the display list. Such a method is often called a stroke method or a vector stroke method.

Picking in a vector stroke method is typically accomplished by placing a pointer, such as a cursor, on, near or within the boundaries of a selected data object on the display. Thereafter, as the display list is re-executed, a match is made between the coordinates of the cursor and the coordinates of one or more pixels in the data object. The match generates a pick interrupt signal. Since the CPU at the time that the pick interrupt signal occurs is in the process of re-executing the display list of the data object that generated the pick interrupt signal, the data object is readily identified and can be operated on in any one of the variety of ways described above.

A disadvantage of picking in a conventional vector stroke method is that each data object is redrawn separately and that when a match occurs between the coordinates of a pointer and the coordinates of one or more pixels in a selected data object, a predetermined period of time is required before the pick interrupt signal is generated and transmitted to the CPU. As a consequence, picking in a conventional vector stroke method requires that the CPU wait said predetermined period of time after re-executing each display list in preparation for receiving a possible pick interrupt signal. In applications involving many display lists, the accumulation of lost CPU time can, therefore, be significant.

Another disadvantage of the vector stroke method is that, without a bit map, there is no permanent record of the data objects displayed.

Clipping is a descriptive term used in general for describing a method and apparatus for displaying a data object on a video display, portions of which are clipped according to some predetermined criteria. For example, a typical prior known method and apparatus used for clipping a data object comprised the use of a regular geometrical shape, such as a square, rectangle, circle, etc. When using the regular geometrical shape for clipping, it was the practice to calculate the intersection points of the data object to be displayed with the boundaries of the geometrical shape. Thereafter, all portions of the data object which lay outside the boundaries were discarded. Alternatively, all portions of the data object which lay inside the boundaries could be discarded, leaving the portions outside the boundaries to be displayed.

A disadvantage of the prior known methods and apparatus used for clipping was that they required solving a system of equations, corresponding software and a large amount of CPU computation time. Moreover, the boundary criteria was generally limited to some regular geometrical shape since irregular geometrical shapes were not easily defined.

SUMMARY OF THE INVENTION

In view of the foregoing, principle objects of the present invention are a novel method and apparatus for picking a selected data object from among a plurality of data objects on a video display in a system in which the data objects are drawn on the display from a bit map.

Other objects of the present invention are a novel method and apparatus for clipping a data object on a video display using any arbitrarily-shaped clipping object, a single pixel or a plurality of widely spaced pixels.

In accordance with the above objects, there is provided a system comprising a system memory, a bit map, a CPU, a direct memory access (DMA) controller and a graphics microprocessor (G$\mu$P). The CPU is coupled to the system memory and the DMA by means of an address and a data bus, and to the G$\mu$P by means of a data bus and a pick software interrupt signal line. The DMA is further coupled to the system memory by means of an address bus and a data bus and to the G$\mu$P by means of the data bus. The G$\mu$P is further coupled to the bit map by means of an address bus and a data bus.

In the system memory, there is provided a segment comprising a plurality of display lists. Each display list comprises a plurality of instructions including a special pick instruction for drawing one of the data objects to be displayed in the bit map, such as a circle, a triangle, etc., and for use in the picking operation. At the head of the segment there is provided a starting address corresponding to the address of the first instruction in the first display list in the segment and a number corresponding to the number of instructions in the segment. A segment corresponds to all of the data objects which appear on a video display at any one time.

In the special pick instruction there is provided an object number which is used for identifying in a separate table the address of the first instruction of the display list with which the special pick instruction is associated.

In operation, upon receipt of a pick request signal indicating that a picking operation is to be performed, the CPU sends the starting address for the first instruction in the segment together with the number of instructions in the segment to the DMA. The pick request signal is provided by means of a pointer, a light pen, cursor, or the like, which is pointed to a selected data object on the video display. The DMA using the starting address then retrieves the instructions in the set from the system memory and sends them to the G$\mu$P. The G$\mu$P then uses the instructions to provide a virtual redrawing of the data object in the bit map in the same manner that it used them for drawing the data object in the bit map initially. The redrawing is called virtual because the write enable inputs of the bit map are not actually enabled during the picking operation. As the G$\mu$P re-executes the instructions, the CPU is free to perform other CPU operations sharing the system address and data buses with the DMA. At the same time, the G$\mu$P compares the coordinates of the pixels associated with the instructions it is executing with the coordinates of the pointer. When a match occurs, the G$\mu$P generates a pick interrupt signal and at the end of the data list a software interrupt signal when the special pick instruction is encountered. The software interrupt signal is then sent to the CPU. Upon receipt of the software interrupt signal, the CPU, using the object number, obtains the starting address of the first instruction of the display list in the table and programs the DMA and G$\mu$P to perform a desired operation on the selected data object associated with the starting address in a conventional manner. For example, the operation may comprise a move, a change in size or color, a delete, or the like.

Further in accordance with the above objects of the present invention there is provided in the bit map a plurality of data memory planes and a match plane. The data planes are provided for storing the pixels of data objects displayed on the video display. The match plane is provided for storing the pixels of a clipping object which is used for clipping portions of a data object displayed on the video display. The clipping object can be an object of any shape or size and, if desired, it can comprise one or a plurality of widely scattered pixels.

Coupled to each of the data memory planes there is provided a source data register, a destination data register, an ALU and a logic circuit. Coupled to the match plane there is provided a one bit register and an ALU.

In operation, the pixels of data objects to be displayed are stored in the data memory planes and pixels of the clipping object are stored in the match plane. Thereafter, when a data object is to be clipped, its initial position (source) and its final position (destination), which at least partially overlaps the location of the clipping object, is sent to the source and destination registers and operated on in the ALU in a conventional manner. At the same time, the match plane is scanned and each pixel therein is compared with a bit in the one-bit register. When a bit in the match plane matches the bit in the one-bit register, which occurs only when the clipping object is being scanned, a match signal is generated. The match signal is then used to enable the logic circuit coupled to each of the data memory planes. When the logic circuit is enabled, a write enable pulse is generated allowing the now clipped data object to be written into the associated data memory plane. Alternatively, the apparatus can be arranged so that the logic circuit is disabled when a match signal is generated. This would have the effect of writing the data object in locations other than those which correspond to the location of the clipping object. This is called inverse clipping.

BRIEF DESCRIPTION OF THE DRAWINGS

The above and other objects, features and advantages of the present invention will become apparent from the following detailed description of the accompanying drawings, in which.

DETAILED DESCRIPTION OF THE DRAWING

Figure 1:
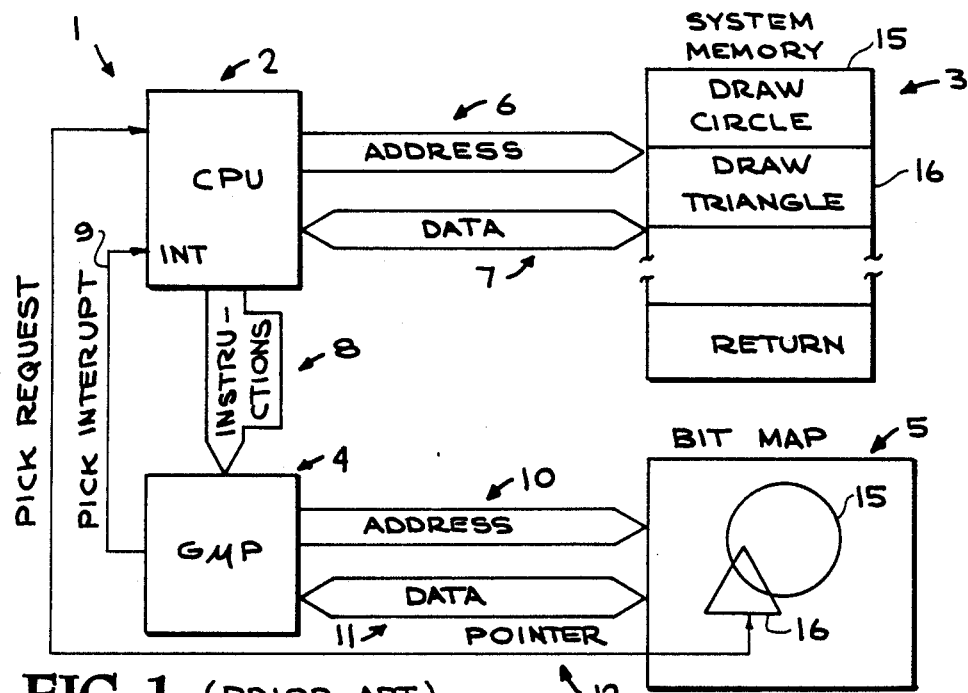
FIG. 1 is a block diagram of a prior known apparatus for picking and operating on a data object on a video display.

Referring to FIG. 1, there is shown a prior known video graphics system designated generally as 1. In the system 1 there is provided a central processing unit (CPU) 2, a system memory 3, a graphics microprocessor (G$\mu$P) 4 and a bit map 5. The CPU 2 is coupled to the system memory 3 by means of an address bus 6 and a data bus 7, to the G$\mu$P 4 by means of an instructions bus 8 and a pick interrupt control signal line 9 and to a pointer by a pick request control signal line 12. The G$\mu$P 4 is coupled to the bit map 5 by means of an address bus 10 and a data bus 11.

For purposes of describing the operation of the system 1, there is provided in the system memory 3 a plurality of display lists 15 and 16. Display list 15 comprises a plurality of instructions for drawing a circle 15 in the bit map 5. The display list 16 comprises a plurality of instructions for drawing a triangle 16 in the bit map 5. For convenience, the circle 15 and the triangle 16 are shown superimposed on the bit map 5 as they might appear on a video display.

To pick one of the data objects 15 or 16 for purposes of operating on the object in some fashion, e.g. move the object, change the size of the object, delete the object, etc., it is necessary to identify the data object after it has been stored in the bit map. As is well known, objects stored in a bit map merely comprise streams of pixels which are scanned for display on a video display. As such, there is typically no distinguishing features associated with the pixels which identify the object.

Consequently, it has been the practice heretofore for an operator to move a pointer such as a cursor, light pen, or the like, to a position on the video display corresponding to the position of the object appearing on the video display. Thereafter, the CPU in conjunction with the GμP re-executes the display list in the system memory 3 to virtually redraw the objects in the bit map. Virtual redrawing is defined as re-executing the display list in the GμP without actually writing to the bit map. As the display lists are being re-executed by the CPU and the GμP, a comparison is made between the coordinates of each pixel and the coordinates of the pointer on the video display. When a match occurs, a pick interrupt signal is generated, halting the further re-execution of the display list. As described above, it has been the practice to halt the operation of the CPU and the GμP after the re-execution of each display list to provide time for the generation of a pick interrupt signal. This period of time, called a pick interrupt evaluation period, was required at the end of the re-execution of each display list, even though no pick interrupt signal was actually generated during the re-execution of the display list. For example, assume that the operator wishes to pick the triangle 16 for some predetermined operation. The operator then moves the pointer to a position coinciding with the position of the triangle on the video display. When the pointer is located at a position coinciding with the position of the triangle 16 on the video display, a pick request signal is generated. The pick request signal is transmitted to the CPU 2. After the CPU 2 receives the pick request signal, the CPU 2 redraws the first display list, in this case the display list draw circle 15, and begins sending the instructions therein sequentially to the GμP 4. The GμP 4 then virtually re-executes the display list 15, thereby virtually redrawing the circle 15. Since the pointer was pointing to the triangle 16 and not to the circle 15, the virtual re-execution of the display list draw circle 15 is completed without the generation of a pick interrupt signal. Nevertheless, the CPU 2 and the GμP 4 must be halted for a predetermined period of time corresponding to the time that is required to evaluate a pick interrupt signal. At the expiration of the predetermined period of time, the CPU 2 and the GμP 4 begin executing the next display list, in this case the display list draw triangle 16. As each instruction in the display list draw triangle 16 is being re-executed, the coordinates of pixels associated with the instructions in the display list are compared with the coordinates of the pointer on the video display and when a match occurs, the pick interrupt signal is generated. After the pick interrupt signal is generated, the CPU and the GμP 4 complete the virtual redrawing of the triangle 16 before responding to the pick interrupt signal. When the CPU responds to the pick interrupt signal, it halts the re-execution of the display lists and executes a set of instructions to perform the operation previously selected by the operator. As will be noted, the CPU 2 is occupied during the entire time that the re-execution of the display lists is occurring and is, therefore, not free to perform other system operations.

Figure 2:
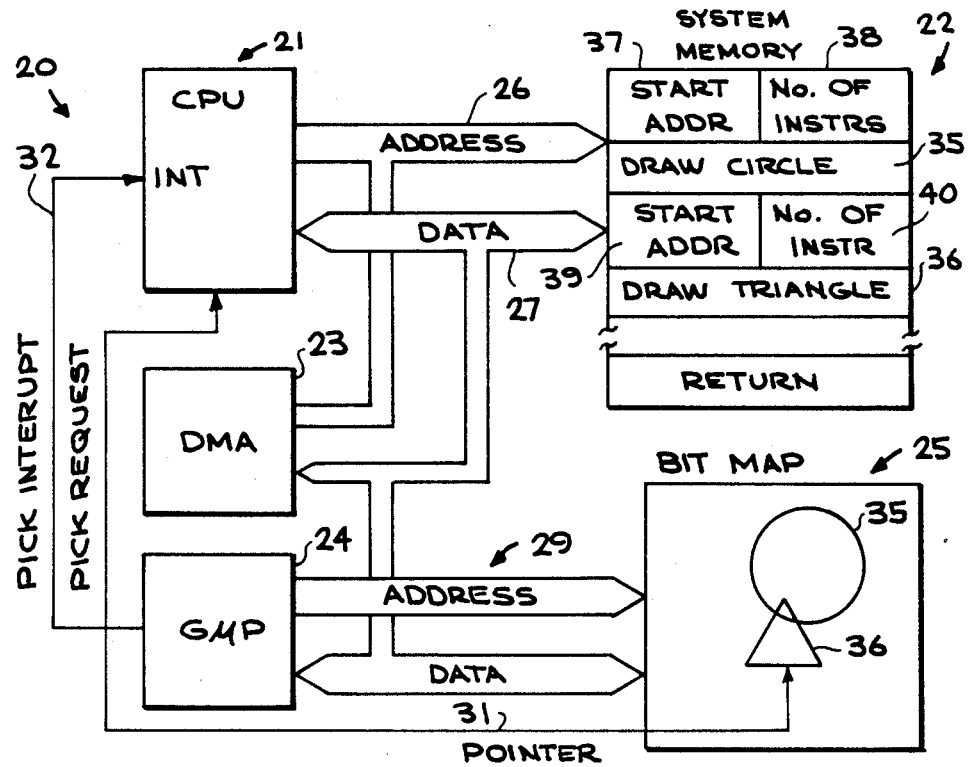
FIG. 2 is a block diagram of another prior known apparatus for picking and operating on a data object on a video display.

Referring to FIG. 2, there is provided in another prior known videographics system designated generally as 20, a CPU 21, a system memory 22, a direct memory access (DMA) circuit 23, a GμP 24 and a bit map 25. The CPU 21 is coupled to the system memory 22 and the DMA 23 by means of an address bus 26 and a data bus 27 and to a pointer by means of a pick request control line 31. The DMA 23 is coupled to the GμP 24 by means of data bus 27. The GμP 24 is coupled to the bit map 25 by means of an address bus 29 and the data bus 27. The GμP 24 is also coupled to the CPU 21 by means of a pick interrupt control signal line 32.

In operation, the system memory 22 is provided with a plurality of display lists including, for example, draw circle 35 and draw triangle 36. Associated with each of the display lists is the address of the first instruction in the display list as well as a number corresponding to the number of instructions in the display list. For example, stored in the system memory 22 in association with the display list draw circle 35 there is provided a start address 37 and a number 38 corresponding to the number of instructions in the draw circle display list 35. Similarly, in association with the display list draw triangle 36 there is provided a start address 39 and a number 40 corresponding to the number of instructions in the display list draw triangle 36.

The circle and the triangle, or data objects as they are called for convenience, are initially stored in the bit map 25. After the data objects are stored in the bit map 25, the bit map 25 is scanned for displaying the objects on a video display. If, thereafter, an operator desires to operate on one of the data objects, such as the triangle 36, the operator positions a pointer such as a cursor, light pen, or the like, in a position coinciding with the data object on the video thereafter generates a pick request signal on the line 31. After the pick request signal is generated and transferred to the CPU 21, the CPU 21 transfers the starting address 37 and the number 38 corresponding to the number of instructions in the first data list draw circle 35 to the DMA 23. At the same time, the starting address 37 is transferred to the CPU 21 and stored in a register located therein. After the starting address 37 and the number 38 are transferred to the DMA 23, the DMA 23 in conjunction with the GμP 24 virtually re-executes the first data list draw circle 35. The term "virtually" is used to indicate that the write enable inputs of the bit map are not actually enabled during the re-execution of the data list. As the data list draw circle 35 is being re-executed by the DMA 23 and the GμP 24, the coordinates of pixels associated with the instructions in the data list draw circle 35 are compared with the coordinates of the pointer coinciding with the selected data object, triangle 36. At the end of the virtual re-execution of the first data list draw circle 35, the DMA controller 23 and GμP 24 are halted for a predetermined period of time to enable the evaluation of a pick interrupt signal if one should occur at or near the end of the virtual re-execution of the data list. If none occurs, the address of the first instruction in the next data list draw triangle 36 together with the number 40 corresponding to the number of instructions in the data list draw triangle 36 are sent to the DMA 23. At the same time the starting address 39 is transferred to the CPU 21. Thereafter, the DMA 23 and GμP 4 automatically commence the virtual re-execution of the next data list draw triangle 36. Once again, the coordinates of pixels associated with the instructions in the display list draw triangle 36 are compared with the coordinates of the pointer and if a match occurs, a pick interrupt signal is generated. The pick interrupt signal is then transferred to the CPU 21. Upon receipt of the pick interrupt signal by the CPU 21, the CPU 21 commences the execution of a program to perform an operation on the data object, i.e. triangle 36, as previously selected by the operator.

Having described two prior known systems for picking a selected data object from among a plurality of data objects displayed on a video display, it will be noted that in the apparatus of FIG. 1, the CPU 2 is used continuously during a picking operation. In the apparatus of FIG. 2, the CPU 21 is freer to perform other operations while the DMA 23 and G$\mu$P 24 are virtually re-executing the display lists, however, the CPU is still prevented from performing other operations for predetermined periods of time after the re-execution of each display list while it waits for a potential pick interrupt signal.

Figure 3:
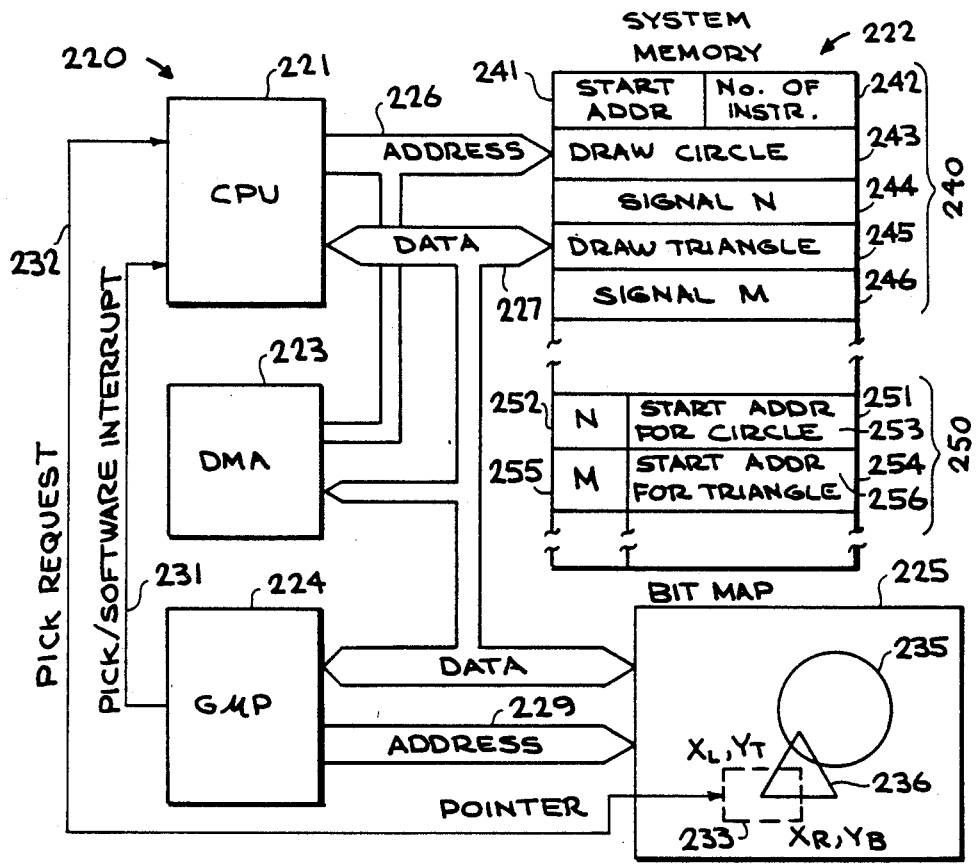
FIG. 3 is a block diagram of an apparatus for picking and operation on a data object on a video display in accordance with the present invention.

Referring to FIG. 3, there is provided in accordance with the present invention a videographics system 220 comprising a CPU 221, a system memory 222, a DMA 223, a graphics microprocessor 224 and a bit map 225. The CPU 221 is coupled to the system memory 222 by means of an address bus 226 and a data bus 227. The DMA 223 is coupled to the system memory 222 by means of the address bus 226 and the data bus 227. The G$\mu$P 224 is coupled to the bit map 225 by means of an address bus 229 and the data bus 227. The G$\mu$P 224 is also coupled to the CPU 221 by means of a pick interrupt control signal line 231. The CPU 221 is also coupled to a pointer by means of a pick request control signal line 232.

Shown superimposed on the bit map 225 there is provided a picking box 233 shown in dashed lines. The left and right edges of the picking box 233 are designated by the coordinates X left, $X_L$ and X right, $X_R$. The top and bottom edges of the picking box 233 are designated by the coordinates Y top, $Y_T$ and Y bottom, $Y_B$. Also superimposed on the bit map 225 there is provided the representation of a circle 235 and a triangle 236. The picking box 233, the circle 235 and the triangle 236 correspond to objects as they would appear on the video display.

In the system memory 222 there is provided a segment 240. Segment 240 is provided with a start address 241 and a number 242 corresponding to the number of instructions in the segment. Following the start address 241 and number 242 there is provided a display list 243. The display list 243 comprises one or more instructions for drawing an object in the bit map 225 such as, for example, draw circle. At the end of the display list 243 there is provided a special picking instruction 244. The picking instruction 244 comprises an operation code signal and a designator N which, as will be further described below, designates the object drawn using the preceding display list. Below the instruction 244 there is provided a second display list 245. The display list 245 comprises a plurality of instructions for drawing in the bit map 225 a second object such as, for example, draw triangle. At the end of the display list 245 there is provided a second special picking instruction 246. The second picking instruction 246, like the picking instruction 244, comprises the opcode signal and a designator M which corresponds to the second object drawn in the bit map 225.

While only two objects are described, it should be understood that a display list and a special picking instruction is provided for each object which appears on a video display at any given time. It will also be appreciated that the segment 240 comprises the sum total of the above-described display lists and special picking instructions and that the start address 241 and the number 222 of instructions comprises the starting address and number of instructions in the segment 240.

Also stored in the memory 222 there is provided an index table 250. In the index table 250 there is provided an entry corresponding to each of the display lists in the segment 240. Accordingly, there is provided in the table 250 a first entry 251. In the entry 251 there is provided a designator 252 and an address 253. The designator 252 comprises the number N which corresponds to the designator N in the special picking instruction 244. The address 253 comprises the starting address for the display list draw circle 243. Below the entry 251 there is provided a second entry 254. The entry 254 comprises a designator 255 and an address 256. The designator 255 comprises a number M corresponding to the designator M in the special picking instruction 246. The address 256 comprises the starting address of the display list draw triangle 245. It should be understood that an entry in the table 250 is provided for each of the display lists provided in the system memory 222.

Figure 4:
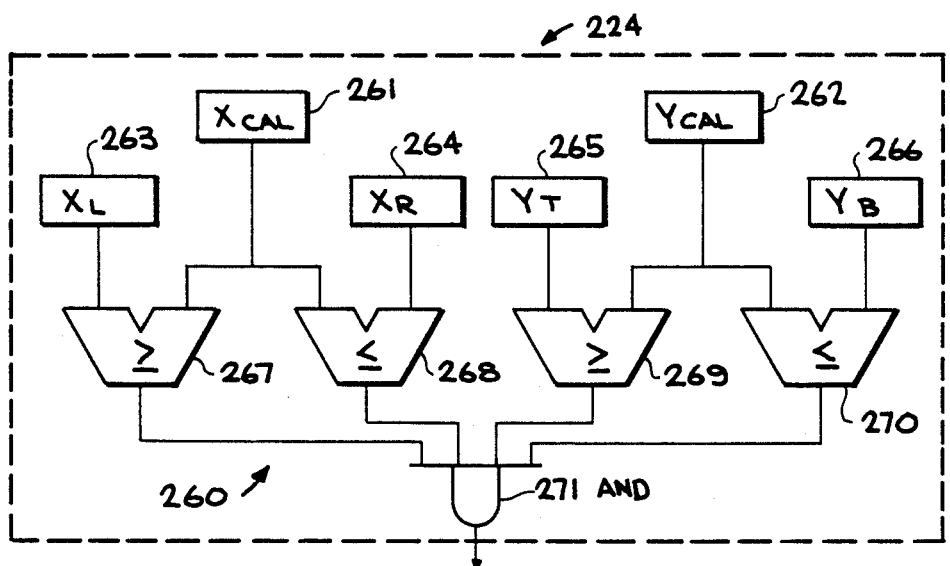
FIG. 4 is a block diagram of a comparator circuit according to the present invention.

Referring to FIG. 4, there is provided in the G$\mu$P 224 a comparator circuit designated 260. In the comparator circuit 260 there is provided a plurality of registers 261–266, a plurality of comparators 267–270 and an AND circuit 271. The registers 261 and 262 are provided for storing the X and Y coordinates of the pixels in the object associated with each of the instructions in the display lists of the segment 240. The registers 263 and 264 are provided for storing the coordinates of the right and left edges of the picking box $X_L$, $X_R$. The registers 265 and 266 are provided for storing the coordinates of the top and bottom of the picking box $Y_T$ and $Y_B$. The comparators 267 and 268 are provided for comparing the contents of the registers 261, 263 and 261, 264, respectively. The comparators 269 and 270 are provided for comparing the contents of the registers 262, 265 and the registers 262, 266, respectively. The outputs of the comparators 267–270 are provided as inputs to the AND gate 271. As further described below, the output of the AND gate 271 is used in the G$\mu$P 224 for generating a software interrupt control signal on the line 231.

In operation, when an operator desires to perform a selected operation on an object appearing on a video display such as, for example, move the object, increase the size of the object, change the color of the object, delete the object, etc., the operator moves a pointer such as a cursor, light pen, or the like, on the surface of the video display. As the operator moves the pointer, the picking box 233, described above with respect to FIG. 3, is moved in a corresponding manner until the picking box intersects the selected object. For purposes of describing the operation of the present invention, the picking box 233 is shown intersecting the triangle 236. After the operator has moved the picking box 233 to intersect the triangle 236, a pick interrupt request signal is generated on the line 232 and transmitted to the CPU 221. Upon receipt of the pick interrupt request signal, the CPU 221 retrieves the starting address 241 and the number 222 of instructions in the segment 240 and transmits them to the DMA 223. Upon receipt of the starting address 241 and number of instructions 222 in the segment 240, the DMA 223 retrieves in sequence each of the display lists and special picking instructions in the segment 240. As each of the instructions is retrieved by the DMA 223 from the system memory 222, they are transmitted to the G$\mu$P 224. Upon receipt of the instructions, the G$\mu$P 224 virtually re-executes the objects associated with the display lists. The operation of the G$\mu$P 224 during the picking process is called virtual redrawing because the objects are not actually drawn in the bit map 225 during the picking operation.

As each instruction in the display lists is re-executed, the coordinates of the object associated therewith are compared with the coordinates of the picking box 233 as described above with respect to FIG. 4. For purposes of the following description, it is assumed that the X and Y coordinates of the pixels in a data object become larger the farther they are away from the left and top edges of the bit map, respectively. For example, when the X coordinate of a pixel associated with an instruction in a display list is larger than or equal to the coordinate $X_L$ of the picking box and smaller than or equal to the coordinate $X_R$ of the picking box, signals will be generated on the output of the comparators 267 and 268. Similarly, when the Y coordinates of the pixel associated with an instruction in the display list is larger than or equal to the coordinate $Y_T$ and smaller than or equal to the coordinate $Y_B$ of the picking box 233, a signal will be generated on the output of the comparators 269 and 270. When signals are generated on each of the outputs of the comparators 267, 268, 269 and 270, a pick interrupt signal is generated on the output of AND gate 271. After the pick interrupt signal is generated, the DMA 223 and the G$\mu$P 224 continue virtually re-executing the data list in which the pick interrupt signal occurred until the special picking instruction at the end thereof is encountered. In the present example, the special picking instruction encountered is the special picking instruction signal M 246. When the special picking instruction is encountered, it is stored in a special register in and executed by the G$\mu$P generating a software interrupt. The software interrupt is generated on the software interrupt control line 231 and transmitted to the CPU 221. After receiving the software interrupt, the CPU 221 reads the special instruction, e.g. Signal M 246, from the special register in the G$\mu$P 224. Upon receipt of the special instruction from the G$\mu$P 224, the CPU 221 strips the opcode Signal from the instruction and, using the designator M, searches the index table 250 for the starting address of the display list associated therewith. In the present example, the CPU 221 retrieves the starting address 256 for the display list draw triangle. After obtaining the starting address 256 for the display list draw triangle 245, the CPU 221 assembles a new display list based on the previously selected operation which the operator has indicated is to be performed on the object picked. After CPU 221 has assembled the new display list, it reprograms the system memory 222 with the new display list, the starting address and the number of words in the segment 240 due to the new display list and sends a restart signal to the DMA 223. Upon receiving the starting address and the number of instructions in the new segment 240, the DMA 223 and the G$\mu$P 224 execute the new segment 240.

Figure 5:
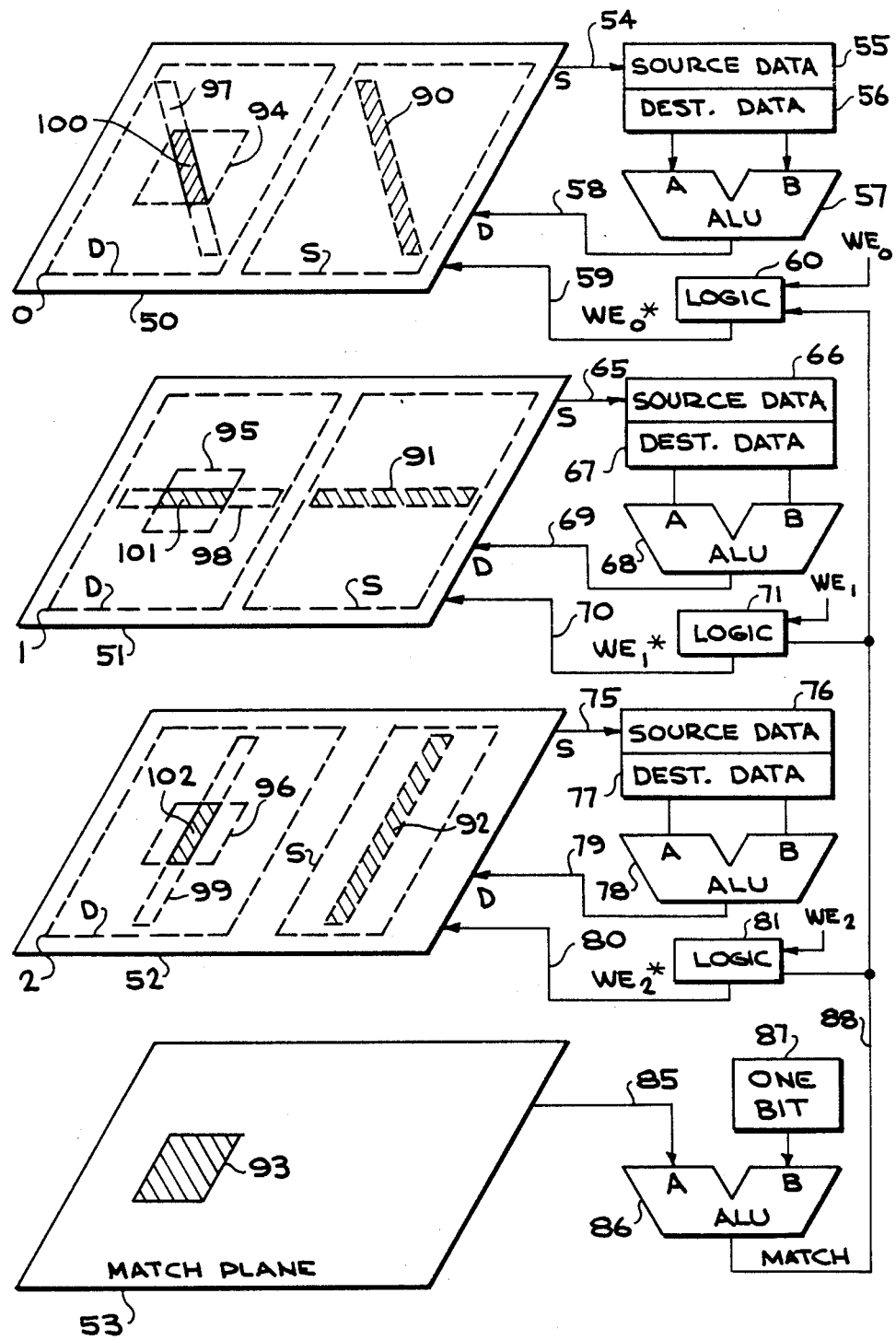
FIG. 5 is a block diagram of an apparatus for clipping unwanted portions from a data object displayed on a video display.

Referring to FIG. 5, there is further provided in the bit map 225 in accordance with the present invention a plurality of data memory planes 50, 51, 52 and a match plane 53. Coupled to the data plane 50 by means of a bus 54, there is provided a source data register 55 and a destination data register 56. The register 55 and 56 are coupled to the A and B inputs, respectively, of an arithmetic logic unit (ALU) 57. The output of the ALU 57 is coupled by means of a bus 58 to the data plane 50. Also coupled to the data plane 50 by means of a write enable bus 59, there is provided a logic circuit 60.

Coupled to the data plane 51 by means of a bus 65 there is provided a source data register 66 and a destination data register 67. The registers 66 and 67 are coupled, respectively, to the A and B inputs of an ALU 68. The output of the ALU 68 is coupled by means of a bus 69 to the data plane 51. Also coupled to the data plane 51 by means of a write enable control signal bus 70, there is provided a logic circuit 71.

Coupled to the data plane 52 by means of a bus 75 there is provided a source data register 76 and a destination data register 77. The register 76 and 77 are coupled, respectively, to the A and B inputs of an ALU 78. The output of ALU 78 is coupled to the data plane 52 by means of a bus 79. Also coupled to the data plane 52 by means of a write enable control signal line 80, there is provided a logic circuit 81.

The match plane 53 is coupled by means of a bus 85 to the A input of an ALU 86. A one bit register 87 is coupled to the B input of the ALU 86. The output of the ALU 86 is coupled by means of a match signal control line 88 to a first input of the logic circuits 60, 71 and 81. A second input of the logic circuit 60 is coupled to a source of write enable pulses $WE_0$. A second input of the logic circuit 71 is coupled to a source of write enable pulses $WE_1$. A second input of the logic circuit 81 is coupled to a source of write enable pulses $WE_2$.

For purposes of describing the operation of the present invention, there is drawn in the data plane 50 a data object 90 shown in dash lines. In data plane 51 there is drawn a data object 91 shown in dash lines. In data plane 52 there is drawn a data object 92 shown in dash lines. In the match plane 53 there is shown a clipping object 93 which is represented by diagonal lines bounded by four solid lines. A projection of the clipping object 93 is shown superimposed on data planes 50, 51, 52 by means of a plurality of corresponding dashed boxes 94, 95, 96.

Also, for purposes of describing the operation of the present invention, it will be assumed that the data objects 90, 91, 92 are to be moved from the position shown in FIG. 5 within a source area S designated by dash lines to the position represented by the corresponding solid and dash lines 97, 98, 99, respectively within a destination area D designated by dash lines D. The diagonal lines of the clipping object 93 are provided to represent corresponding pixels in the match plane 53 which are set to a logical binary 1 value.

In operation, in a first embodiment of the present invention, a logical binary 1 is stored in the one bit register 87. Thereafter, the pixels in the data planes 50, 51, 52 and the pixels in the match plane 53 are scanned in a predetermined sequence. It is assumed that the pixels in the data planes are in correspondence with the pixels in the match plane if they have the same (X,Y) coordinates. As the pixels in the match plane 53 are scanned, they are compared with the contents of the one-bit register 87. In the present example, all pixels outside of the clipping object 93 are assumed to comprise a logical binary 0 value. As the pixels in the match plane 53 are compared with the contents of the one-bit register 87, a match signal will be generated on the match signal line 88 when the logical binary 1 bits of the clipping object 93 are scanned. The match signal on the match signal line 88 is then applied to the logic circuits 60, 71, 81, enabling the logic circuits to transmit the write enable signals $WE_0$, $WE_1$, $WE_2$ to the data planes 50, 51, 52, respectively. These signals are represented as $WE_0^*$, $WE_1^*$, and $WE_2^*$, respectively. As a consequence, the data planes 50, 51, 52 are enabled to re-store in an otherwise conventional manner, using the contents of the source and destination register and the ALU's, the pixels of the objects 90,91,92 only when there is a predetermined correspondence between said pixels and a corresponding pixel scanned in the match plane 53. This is represented by the diagonal lines shown at 100, 101, 102, respectively.

In another embodiment of the present invention, a logical binary 0 is stored in the one-bit register 87. Thereafter, as the pixels in the match plane 53 are scanned, a match signal will be generated on the match signal control line 88 for all pixels outside of the boundaries of the clipping object 93 which, as previously indicated, represents a group of pixels comprising logical binary 1 values. The effect of this operation is to recreate the objects 90, 91, 92 within the areas defined by the dash lines 97, 98, 99, but with a gap therein represented by the diagonal lines 100, 101, 102, respectively.

While the embodiments of FIG. 5 are described above with respect to a plurality of pixels located within a rectangularly shaped boundary, it should be apparent that the clipping object may also comprise an object of any size or shape within the limits of the match plane 53 and, indeed, may comprise a single pixel or one or more widely scattered pixels comprising either logical binary 1 or logical binary 0 values.

While several embodiments of the present invention are described above, it is contemplated that various modifications may be made thereto without departing from the spirit and scope of the present invention. Accordingly, it is intended that the embodiments described be considered as only illustrative of the invention and that the scope of the invention be determined by the claims hereinafter provided.

What is claimed is:

1. A method of picking a data object from among a plurality of data objects appearing on a video display in a video system having a central processing unit (CPU), a system memory, a bit map, a direct memory access (DMA) circuit and a graphics microprocessor (G$\mu$P), comprising the steps of:

storing in said system memory a segment comprising a plurality of display lists, each of said display lists in said segment comprising a plurality of instructions for storing one of said plurality of data objects in said bit map, at least one of said instructions comprising a special pick instruction having an operation code and an object number corresponding to said one of said data objects;

storing at the beginning of said segment the starting address of the first instruction in said segment and a number corresponding to the number of instructions in said segment;

storing in said system memory an index table of index entries, each of said entries comprising an object number and the address of the first instruction in the data list for the data object associated with said object number;

executing the instructions in said segment for storing said plurality of data objects in said bit map;

displaying each of said data objects in said bit map on said video display;

moving a pointer on said video display to a position coinciding with the position of said data object on said video display;

generating a pointer signal for indicating the position of said pointer on said video display and a pick request signal when the position of said pointer coincides with the position of said selected data object;

transferring in response to said pick request signal said starting address of the first instruction in said segment and said number corresponding to the number of instructions in said segment from said system memory to said DMA circuit;

transferring each of said instructions in said segment from said system memory to said DMA after said starting address and said number of instructions in said segment are transferred to said DMA;

transferring each of said instructions in said segment from said DMA circuit to said G$\mu$P for virtually re-executing each of said instructions;

comparing the coordinates of each pixel associated with an instruction which is virtually executed in said G$\mu$P with said position of said pointer on said video display;

generating a pick interrupt signal when a match occurs between the coordinates of a data object pixel and said position of said pointer;

generating a software interrupt signal when said special pick instruction in said display list of said selected data object is executed by said G$\mu$P after said pick interrupt signal is generated;

transferring said software interrupt signal to said CPU;

transferring in response to the receipt of said software interrupt signal by said CPU said special pick instruction from said G$\mu$P to said CPU;

transferring from said index table in said system memory to said CPU the index entry associated with said special pick instruction;

generating in response to the receipt of said index entry by said CPU a new display list for performing a selected operation on said selected data object; and transferring said new display list to said DMA and said G$\mu$P for performing said selected operation on said selected data object.

2. A method according to claim 1 wherein said special pick instruction is the last instruction in each of said display lists.

3. A method according to claim 1 wherein said pointer and said selected data object comprises a boundary and said pick interrupt signal generating step comprises the step of generating a pick interrupt signal when at least one pixel of said pointer boundary coincides with at least one pixel of said selected data object on said video display.

4. A method according to claim 1 wherein said pointer and said selected data object comprises a boundary defined by coordinates, said comparing step comprises the step of comparing said coordinates of said pointer boundary and said coordinates of said selected data object boundary and said pick interrupt signal generating step comprises the step of generating said pick interrupt signal when said coordinates of said pointer boundary and said coordinates of said selected data object boundary have a predetermined correspondence.

5. A method of clipping a data object appearing on a video display in a video system when said data object is moved from a source area S on said display to a destination area D on said display, said destination area D being spaced from said source area S, said video system having a bit map, and a one-bit register, said bit map comprising a data plane and a match plane, said data plane and said match plane comprising pixels, comprising the steps of:

storing said data object in said data plane within an area in said data plane which corresponds to said source area S on said display, said data object in said data plane comprising pixels having a predetermined logical binary value;

storing a clipping object in said match plane within an area in said match plane which corresponds to said destination area D on said display, said clipping object in said match plane comprising pixels having a predetermined logical binary value;

moving said data object in said data plane from said area corresponding to said source area S on said display to an area corresponding to said destination area D on said display;

scanning the pixels in said data plane as said data object is being moved;

scanning the pixels in said match plane as said data object is being moved;

comparing said pixels in said match plane as they are being scanned against the contents of said one-bit register for generating a write enable signal when a pixel in said match plane matches the contents of said one-bit register; and enabling said data plane to store within said area in said data plane which corresponds to said destination area D on said display each pixel scanned in said data plane which corresponds spatially with a pixel scanned in said match plane when said write enable signal is generated, each of said pixels in said match plane having a predetermined correspondence with the contents of said one-bit register.

6. A method according to claim 5 wherein each of said pixels in said match plane comprises either a logical 1 or a logical 0 and said predetermined correspondence exists when said pixel in said match plane is equal to the contents of the one-bit register.

7. A method according to claim 5 wherein each of said pixels in said match plane comprises either a logical 1 or a logical 0 and said predetermined correspondence exists when said pixel in said match plane is equal to the opposite of the contents of said one-bit register.

8. A method according to claim 5 wherein said enabling step comprises the steps of comparing each pixel scanned in said match plane with the contents of said one-bit register for generating a match signal when a predetermined correspondence exists between said pixel scanned in said match plane and said contents of said one-bit register;

providing a write enable control signal; and transferring said write enable control signal to said data plane for enabling said data plane to store in said data plane a pixel scanned in said data plane corresponding spatially to said pixel scanned in said match plane when said match signal is generated.

9. A method according to claim 8 wherein said predetermined correspondence exists between said pixel scanned in said match plane and said contents of said one-bit register when both comprise the same logical binary value.

10. A method according to claim 8 wherein said predetermined correspondence exists between said pixel scanned in said match plane and said contents of said one-bit register when they comprise opposite logical binary values.

11. An apparatus for picking a data object from among a plurality of data objects appearing on a video display in a video system having a central processing unit (CPU), a system memory, a bit map, a direct memory access (DMA) circuit and a graphics microprocessor (G$\mu$P), comprising:

means for storing in said system memory a segment comprising a plurality of display lists, each of said display lists in said segment comprising a plurality of instructions for storing one of said plurality of data objects in said bit map, at least one of said instructions comprising a special pick instruction having an operation code and an object number corresponding to said one of said data objects;

means for storing at the beginning of said segment the starting address of the first instruction in said segment and a number corresponding to the number of instructions in said segment;

means for storing in said system memory an index table of index entries, each of said entries comprising an object number and the address of the first instruction in the data list for the data object associated with said object number;

means for executing the instructions in said segment for storing said plurality of data objects in said bit map;

means for displaying each of said data objects in said bit map on said video display;

means for moving a pointer on said video display to a position coinciding with the position of a data object on said video display;

means for generating a pointer signal corresponding to the position of said pointer on said video display and a pick request signal when the position of said pointer coincides with the position of said data object;

means for transferring in response to said pick request signal said starting address of the first instruction in said segment and said number corresponding to the number of instructions in said segment from said system memory to said DMA circuit;

means for transferring each of said instructions in said segment from said system memory to said DMA after said starting address and said number of instructions in said segment are transferred to said DMA;

means for transferring each of said instructions in said segment from said DMA circuit to said G$\mu$P for virtually re-executing each of said instructions;

means for comparing the coordinates of each pixel associated with an instruction which is virtually executed in said G$\mu$P with said position of said pointer on said video display;

means for generating a pick interrupt signal when a match occurs between the coordinates of a data object pixel and said position of said pointer;

means for generating a software interrupt signal when said special pick instruction in said display list of said selected data object is executed by said G$\mu$P after said pick interrupt signal is generated;

means for transferring said software interrupt signal to said CPU;

means for transferring in response to the receipt of said software interrupt signal by said CPU said special pick instruction from said G$\mu$P to said CPU;

means for transferring from said index table in said system memory to said CPU the index entry associated with said special pick instruction;

means for generating in response to the receipt of said index entry by said CPU a new display list for performing a selected operation on said selected data object; and means for transferring said new display list to said DMA and said GμP for performing said selected operation on said selected data object.

12. An apparatus according to claim 11 wherein said special pick instruction is the last instruction in each of said display lists.

13. An apparatus according to claim 11 wherein said pointer and said selected data object comprises a boundary and said pick interrupt signal generating means comprises the means for generating a pick interrupt signal when at least one pixel of said pointer boundary coincides with at least one pixel of said selected data object on said video display.

14. An apparatus according to claim 11 wherein said pointer and said selected data object comprises a boundary defined by coordinates, said comparing means comprises means for comparing said coordinates of said pointer boundary and said coordinates of said selected data object boundary and said pick interrupt signal generating means comprises means for generating said pick interrupt signal when said coordinates of said pointer boundary and said coordinates of said selected data object boundary have a predetermined correspondence.

15. An apparatus for clipping a data object appearing on a video display in a video system when said data object is moved from a source area S on said display to a destination area D on said display, comprising:

a bit map comprising a data plane for storing a data object and a match plane for storing a clipping object, said data plane and said match plane comprising spatially corresponding pixels and said clipping object comprising pixels having a predetermined logical binary value;

a one-bit register for storing a bit having a predetermined logical binary value;

means for moving said data object in said data plane from an area corresponding to said source area S on said display to an area corresponding to said destination area D on said display;

means for scanning the pixels in said data plane as said data object is being moved;

means for scanning the pixels in said match plane as said data object is being moved;

means for comparing said pixels in said match plane and the contents of said one-bit register as said pixels in said match plane are being scanned; and means for enabling said data plane to store in said data plane in said area corresponding to said destination area D on said display each pixel scanned in said data plane which corresponds spatially with a pixel in said match plane when said pixel in said match plane has a predetermined correspondence with the contents of said one-bit register.

16. An apparatus according to claim 15 wherein each of said pixels in said match plane comprises either a logical 1 or a logical 0 and said predetermined correspondence exists when said pixel in said match plane is equal to the contents of the one-bit register.

17. An apparatus according to claim 15 wherein each of said pixels in said match plane comprises either a logical 1 or a logical 0 and said predetermined correspondence exists when said pixel in said match plane is equal to the opposite of the contents of the reference bit register.

18. An apparatus according to claim 15 wherein said enabling means comprises means for comparing each pixel scanned in said match plane with the contents of said one-bit register for generating a match signal when a predetermined correspondence exists between said pixel scanned in said match plane and said contents of said one-bit register;

means for providing a write enable control signal; and means for transferring said write enable control signal to said data plane for enabling said data plane to store in said data plane a pixel scanned in said data plane corresponding spatially to said pixel scanned in said match plane when said match signal is generated.

19. An apparatus according to claim 18 wherein said predetermined correspondence exists between said pixel scanned in said match plane and said contents of said one-bit register when both comprise the same logical binary value.

20. An apparatus according to claim 18 wherein said predetermined correspondence exists between said pixel scanned in said match plane and said contents of said one-bit register when they comprise opposite logical binary values.

* * * * *